United States Patent
Takahoshi et al.

(10) Patent No.: US 8,804,285 B2
(45) Date of Patent: Aug. 12, 2014

(54) MAGNETIC RECORDING MEDIUM AND MAGNETIC STORAGE APPARATUS

(71) Applicant: Showa Denko K.K., Tokyo (JP)

(72) Inventors: Hideaki Takahoshi, Chiba (JP); Daisuke Amiya, Chiba (JP); Hiroshi Sakai, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/894,558

(22) Filed: May 15, 2013

(65) Prior Publication Data
US 2013/0314814 A1    Nov. 28, 2013

(30) Foreign Application Priority Data

May 28, 2012 (JP) ................................ 2012-121358

(51) Int. Cl.
*G11B 5/738* (2006.01)
*G11B 5/65* (2006.01)
*G11B 5/66* (2006.01)

(52) U.S. Cl.
CPC ........................................ *G11B 5/66* (2013.01)
USPC ............................ 360/135; 428/827; 428/829

(58) Field of Classification Search
CPC ............ G11B 5/66; G11B 5/65; G11B 5/667; G11B 5/7325; G11B 5/656; G11B 5/82; G11B 2005/0029; G11B 5/64
USPC ................. 360/135; 428/828, 828.1, 827, 829
See application file for complete search history.

(56) References Cited

U.S. PATENT DOCUMENTS 7,470,474 B2    12/2008    Sakawaki et al.

FOREIGN PATENT DOCUMENTS

| JP | 07-244831 | | 9/1995 |
|----|-----------|---|--------|
| JP | 2003-228801 | | 8/2003 |
| JP | 2004-310910 | | 11/2004 |
| JP | 2007-272990 | | 10/2007 |
| JP | 2009-070444 | | 4/2009 |
| JP | 2011123977 A | * | 6/2011 |
| JP | 2011138563 A | * | 7/2011 |

OTHER PUBLICATIONS

English-machine translation of JP 2011-123977 A to Tanaka, published Jun. 23, 2011.*
English-machine translation of JP 2011-138563 A to Tanaka, published Jul. 14, 2011.*

* cited by examiner

*Primary Examiner* — Will J Klimowicz
(74) *Attorney, Agent, or Firm* — IPUSA, PLLC

(57) ABSTRACT

A magnetic recording medium may include an orientation control layer, a lower recording layer, an intermediate layer, and an upper recording layer that are stacked. The lower recording layer may have a coercivity higher than that of the upper recording layer, and the intermediate layer may include a layer including a magnetic material and having a saturation magnetization of 50 emu/cc or higher. The upper recording layer may include columnar crystals continuous with crystal particles forming the intermediate layer in a direction in which the layers are stacked.

13 Claims, 3 Drawing Sheets

MAGNETIC RECORDING MEDIUM AND MAGNETIC STORAGE APPARATUS

CROSS-REFERENCE TO RELATED APPLICATIONS

This application is based upon and claims the benefit of priority of the prior Japanese Patent Application No. 2012-121358 filed on May 28, 2012, the entire contents of which are incorporated herein by reference.

BACKGROUND OF THE INVENTION

1. Field of the Invention

The present invention relates to a magnetic recording medium and a magnetic storage apparatus.

2. Description of the Related Art

Applications of the magnetic storage apparatus such as an HDD (Hard Disk Drive) are increasing, and importance of the magnetic storage apparatus is increasing. In addition, in the magnetic recording medium such as a magnetic disk, the recording density is increasing at a rate of over 50% per year, and this trend may be expected to continue in the future. With this trend of increasing recording density, magnetic heads and magnetic recording media suited for the high recording density are being developed.

The magnetic storage apparatus may be provided with the so-called perpendicular magnetic recording medium in which an axis of easy magnetization within a recording layer is mainly oriented in a perpendicular direction. In the perpendicular magnetic recording medium, the effects of demagnetization is small in a boundary region between recorded bits, and a sharp bit boundary may be formed, to thereby suppress increase of noise, even when the recording density is high. In addition, in the perpendicular magnetic recording medium, the decrease in the recording bit volume caused by the high recording density is small, and the thermal stability of written bits (or characteristic to withstand heat fluctuation) may be improved. The thermal stability of written bits may also be simply referred to as "thermal stability".

In order to cope with the demands to further improve the high recording density of the magnetic recording medium, studies are being made to use a single-pole head having a desirable write performance with respect to the perpendicular recording layer. More particularly, a proposed magnetic recording medium is provided with a back layer made of a soft magnetic material between the perpendicular recording layer and a nonmagnetic substrate, in order to improve the input and output efficiency of magnetic flux between the single-pole magnetic head and the magnetic recording medium.

Further, in order to improve the recording and reproducing characteristic and the thermal stability of the perpendicular magnetic recording medium, a Japanese Laid-Open Patent Publication No. 2004-310910 proposes using an orientation control layer, forming a recording layer with a multi-layer structure, and making crystal particles of each of the magnetic layers of the recording layer have a continuous columnar crystal shape, so that the perpendicular orientation of the recording layer may be improved, for example.

For example, a Japanese Laid-Open Patent Publication No. 7-244831 proposes using Ru for the orientation control layer. In addition, because a dome-shaped projection is formed at a peak part of the columnar crystal of Ru, it is reported in a Japanese Laid-Open Patent Publication No. 2007-272990 that when crystal particles of the recording layer or the like are grown on the Ru dome-shaped projection and the isolation structure of the grown crystal particles is promoted to isolate the crystal particles, this has the effect of growing the magnetic particles in the columnar shape.

For example, a Japanese Laid-Open Patent Publication No. 2009-70444 proposes forming the perpendicular recording layer from an alloy having CoCrPt as its main component, in the perpendicular magnetic recording medium having the perpendicular recording medium formed on the substrate via a soft magnetic underlayer and a nonmagnetic intermediate layer.

For example, a Japanese Laid-Open Patent Publication No. 2004-310910 proposes forming the perpendicular recording layer by two or more magnetic layers, making at least one of the magnetic layers to include Co as its main component and to include Pt and an oxide, and making the other of the magnetic layers to include Co as its main component and to include Cr but no oxide, in order to improve the recording and reproducing characteristic and the thermal stability, and enable high-density information recording and reproduction.

However, in the conventional magnetic recording medium and the conventional magnetic storage apparatus, it may be difficult to improve the recording capacity.

SUMMARY OF THE INVENTION

Embodiments of the present invention may provide a magnetic recording medium and a magnetic storage apparatus that improve the recording capacity.

According to one aspect of the present invention, a magnetic recording medium may include a stacked structure including an orientation control layer, a lower recording layer, an intermediate layer, and an upper recording layer that are sequentially stacked, wherein the lower recording layer has a coercivity higher than that of the upper recording layer, the intermediate layer includes a layer including a magnetic material and having a saturation magnetization of 50 emu/cc or higher, and the upper recording layer includes columnar crystals continuous with crystal particles forming the intermediate layer in a direction in which the layers of the stacked structure are sequentially stacked.

According to another aspect of the present invention, a magnetic recording medium may include a stacked structure including an orientation control layer, a lower recording layer, an intermediate layer, and an upper recording layer that are sequentially stacked, wherein the lower recording layer has a coercivity higher than that of the upper recording layer, the orientation control layer includes a layer including a magnetic material and having a saturation magnetization of 50 emu/cc or higher, and the lower recording layer includes columnar crystals continuous with crystal particles forming the orientation control layer in a direction in which the layers of the stacked structure are sequentially stacked.

According to still another aspect of the present invention, a magnetic storage apparatus may include a magnetic recording medium described above; and a magnetic head configured to read and write information with respect to a perpendicular magnetic layer formed by the upper recording layer and the lower recording layer of the magnetic recording medium.

DESCRIPTION OF THE PREFERRED EMBODIMENTS

Figure 1:
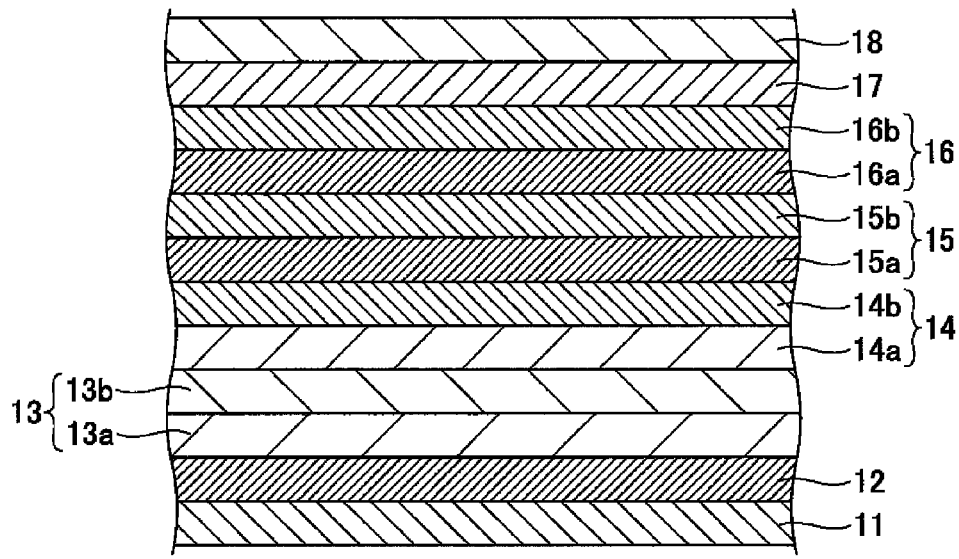
FIG. 1 is a cross sectional view illustrating a part of a structure of an example of a magnetic recording medium in one embodiment of the present invention.

In one embodiment of the present invention, a magnetic recording medium may have a structure in which an orientation control layer, a lower recording layer, an intermediate layer, and an upper recording layer having a coercivity lower than that of the lower recording layer are sequentially stacked in this order. The orientation control layer may include a layer that includes a magnetic material and has a saturation magnetization of 50 emu/cc or higher. The lower recording layer may include columnar crystals that are continuous with crystal particles forming the orientation control layer, in a direction taken along a thickness of the magnetic recording medium. The intermediate layer may include a layer that includes a magnetic material and has a saturation magnetization of 50 emu/cc or higher. The upper recording layer may include columnar crystals that are continuous with crystal particles forming the intermediate layer, in the direction taken along the thickness of the magnetic recording medium. It may be sufficient for at least one of the lower recording layer and the upper recording layer to include the columnar crystals. A magnetic storage apparatus may include a magnetic recording medium in which at least one of the lower recording layer and the upper recording layer includes the columnar crystals.

A description will be given of the magnetic recording medium and the magnetic storage apparatus in each embodiment of the present invention, by referring to the drawings.

In the magnetic recording medium such as a magnetic disk, there are demands to further increase the recording density with respect to the demands to improve the recording capacity. The general magnetic disk has a servo information region in which servo information is recorded, and a data region in which information (or data) is recorded and reproduced, and the servo information region and the data region are located at independent regions on a recording surface of the magnetic disk. A magnetic head may read the servo information from the servo information region in order to detect a position of the magnetic head. Hence, the magnetic head may be moved to a specified position to read or write data, depending on the position detected from the read servo information. For this reason, the servo information region occupies a relatively large part of the magnetic disk, to thereby prevent the recording capacity (that is, the data recordable capacity) of the magnetic disk from being further improved.

For example, as proposed in a Japanese Laid-Open Patent Publication No. 2003-228801, it may be conceivable to form the recording layer of the magnetic recording medium from a lower layer part and an upper layer part having a coercivity lower than that of the lower layer part, and to record the servo information on the lower layer part having the higher coercivity and record the data on the upper layer part having the lower coercivity. Because the servo information region in which the servo information is recorded and the data region in which the data is recorded and reproduced may overlap in a plan view of the magnetic recording medium, the data region may be increased when compared to a case in which the servo information region and the data region are provided on the same recording layer. The servo information and the data that are simultaneously reproduced from the magnetic recording medium may be separated depending on different frequency bands, by recording the servo information and the data at different frequencies.

However, the upper layer part and the lower layer part of the recording layer are provided with a separation, in order to block the magnetic coupling between the upper layer part and the lower layer part of the recording layer. For this reason, a distance between the upper layer part of the recording layer and a soft magnetic layer that is located under the lower layer part of the recording layer increases, and the input and output efficiency of the magnetic flux between the magnetic head and each of the upper layer part of the recording layer and the soft magnetic layer deteriorates. In addition, the distance between the lower layer part of the recording layer and the magnetic head increases, and the recording and reproducing characteristic with respect to the lower layer part of the recording layer deteriorates. Further, it is particularly difficult to reduce the magnetic particle size of the upper layer part of the recording layer and realize a high perpendicular orientation. Accordingly, it may be difficult to improve the recording capacity of the magnetic recording medium.

The present inventors studied the materials used for the orientation control layer that is provided between the lower recording layer forming the recording layer and the soft magnetic underlayer located under the lower recording layer, and the materials used for the intermediate layer that is provided between the upper recording layer forming the recording layer and the lower recording layer forming the recording layer located under the upper recording layer. From results of such studies, the present inventors found that a magnetic recording medium having a recording and reproducing characteristics, represented by a SNR (Signal-to-Noise Ratio) or an OW (Over-Write) characteristic, and a thermal stability (or characteristic to withstand heat fluctuation), suited for high density recording, may be realized when the orientation control layer is formed by a layer that includes a magnetic material and has a saturation magnetization of 50 emu/cc or higher and the lower recording layer includes columnar crystals that are continuous with crystal particles forming the orientation control layer, in a direction taken along the thickness of the magnetic recording medium, or when the intermediate layer is formed by a layer that includes a magnetic material and has a saturation magnetization of 50 emu/cc or higher and the upper recording layer includes columnar crystals that are continuous with crystal particles forming the intermediate layer, in the direction taken along the thickness of the magnetic recording medium. The magnetic recording medium may be a magnetic disk, for example.

The magnetic recording medium may have a structure in which the soft magnetic underlayer, the orientation control layer to control the orientation of a layer located immediately above the orientation control layer, the lower recording layer, the intermediate layer, and the upper recording layer having the coercivity lower than that of the lower recording layer are stacked on a nonmagnetic substrate, for example. The intermediate layer may include a layer that includes a magnetic material and has a saturation magnetization of 50 emu/cc or higher, or the orientation control layer may include a layer that includes a magnetic material and has a saturation magnetization of 50 emu/cc or higher. The lower recording layer may include columnar crystals that are continuous with crystal particles forming the orientation control layer in the direction taken along the thickness of the magnetic recording medium, or the upper recording layer may include columnar crystals that are continuous with crystal particles forming the intermediate layer in the direction taken along the thickness of the magnetic recording medium.

In a case in which both of the orientation control layer and the intermediate layer include a magnetic material and has a saturation magnetization of 50 emu/cc or higher, the lower recording layer may include columnar crystals that are continuous with crystal particles forming the orientation control layer in the direction taken along the thickness of the magnetic recording medium, and the upper recording layer may include columnar crystals that are continuous with crystal particles forming the intermediate layer in the direction taken along the thickness of the magnetic recording medium.

The layer that includes the magnetic material and has the saturation magnetization of 50 emu/cc or higher may preferably be a Ru alloy layer, for example. In addition, the magnetic material may preferably be Co or Fe, for example.

For example, the Ru alloy layer may preferably be a CoRu alloy layer having a Co-content in a range of 66 at % to 80 at % and a saturation magnetization in a range of 50 emu/cc to 700 emu/cc, or a FeRu alloy layer having a Fe-content in a range of 73 at % to 80 at % and a saturation magnetization in a range of 50 emu/cc to 500 emu/cc.

The magnetic storage apparatus may include a magnetic recording medium having the structure described above, and a magnetic head having a function of writing information (or data) to and reading information (or data) from the magnetic recording medium. The magnetic head may write data to and read data from the magnetic recording medium by reading the servo information recorded in the lower recording layer by the magnetic head. The position of the magnetic head detected from the read servo information may be used to position the magnetic head to a specific position on the magnetic recording medium, in order to write data to and read data from the upper recording layer by the magnetic head located at the specification position on the magnetic recording medium.

Next, a description will be given of the magnetic recording medium, the magnetic storage apparatus, and a method of writing data to and reading the data from the magnetic recording medium in each embodiment of the present invention.

(Magnetic Recording Medium)

FIG. 1 is a cross sectional view illustrating a part of a structure of an example of the magnetic recording medium in one embodiment of the present invention. In FIG. 1, the thickness of each layer is not illustrated on a scale in proportion to actual dimensions. A magnetic disk 1 illustrated in FIG. 1 is an example of the magnetic recording medium.

As illustrated in FIG. 1, the magnetic disk 1 may include a soft magnetic underlayer 12, an orientation control layer 13, a lower recording layer 14, an intermediate layer 15, an upper recording layer 16, and a protection layer 17 that are sequentially stacked in this order on a nonmagnetic substrate 11, for example. A lubricant layer 18 may be provided on the protection layer 17. The orientation control layer 13 may include a first orientation control layer 13a and a second orientation control layer 13b. The lower recording layer 14 may include a first lower recording layer 14a and a second lower recording layer 14b. The intermediate layer 15 may include a first intermediate layer 15a and a second intermediate layer 15b. In this example, the upper recording layer 16 and the lower recording layer 14 sandwiching the intermediate layer 15 form a perpendicular recording layer (or perpendicular magnetic layer).

(Nonmagnetic Substrate)

The nonmagnetic substrate 11 may be formed by a metal substrate formed by a metal material such as aluminum and aluminum alloy, a non-metal substrate formed by a non-metal material such as glass, ceramics, silicon, silicon carbide and carbon, and the like. In addition, the nonmagnetic substrate 11 may be formed with a NiP layer or a NiP alloy layer on the surface of the metal substrate or the non-metal substrate, by plating, sputtering, and the like.

Corrosion of the nonmagnetic substrate 11 may occur when the nonmagnetic substrate 11 makes contact with the soft magnetic underlayer 12 having Co or Fe as its main component, due to absorption gas at the surface of the nonmagnetic substrate 11, the effects of moisture, the diffusion of the substrate component, and the like. The main component of an alloy refers to an element having a largest amount within the alloy. From the point of view of preventing the corrosion, a bonding layer (not illustrated) may preferably be provided between the nonmagnetic substrate 11 and the soft magnetic underlayer 12. The bonding layer may be made of Cr, Cr alloy, Ti, Ti alloy, and the like. The bonding layer may preferably have a thickness of 2 nm (20 Å) or greater. The bonding layer may be formed by sputtering and the like.

(Soft Magnetic Underlayer)

The soft magnetic underlayer 12 is formed on the nonmagnetic substrate 11. The method of forming the soft magnetic underlayer 12 is not limited to a particular method, and for example, sputtering and the like may be used.

The soft magnetic underlayer 12 may be provided in order to increase a perpendicular direction component of the magnetic flux generated from the magnetic head (not illustrated) which will be described later with respect to the surface (hereinafter also referred to as a "substrate surface") of the nonmagnetic substrate 11, and to strongly fix (or pin) the magnetization direction of the perpendicular magnetic layer on which the information is recorded in the direction perpendicular with respect to the nonmagnetic substrate 11. Such functions of the soft magnetic underlayer 12 may be particularly notable when the single-pole magnetic head for the perpendicular recording is used as the magnetic head.

The soft magnetic underlayer 12 may be formed by Fe or a soft magnetic material including Ni, Co, and the like. The soft magnetic material may include CoFe alloys, FeCo alloys, FeNi alloys, FeAl alloys, FeCr alloys, FeTa alloys, FeMg alloys, FeZr alloys, FeC alloys, FeN alloys, FeSi alloys, FeP alloys, FeNb alloys, FeHf alloys, FeB alloys, and the like. The CoFe alloys may include CoFeTaZr, CoFeZrNb, and the like. The FeCo alloys may include FeCo, FeCoV, and the like. The FeNi alloys may include FeNi, FeNiMo, FeNiCr, FeNiSi, and the like. The FaAl alloys may include FeAl, FeAlSi, FeAlSiCr, FeAlSiTiRu, FeAlO, and the like. The FeCr alloys may include FeCr, FeCrTi, FeCrCu, and the like. The FeTa alloys may include FeTa, FeTaC, FeTaN, and the like. The FeMg alloys may include FeMgO and the like, and the FeZr alloys may include FeZrN and the like.

In addition, the soft magnetic underlayer 12 may be formed by a material such as FeAlO, FeMgO, FeTaN, FeZrN and the like having an Fe-content of 60 at % or higher and a microcrystal structure, or a material having a granular structure in which the microcrystal particles are dispersed within the matrix.

Furthermore, the soft magnetic underlayer 12 may be formed by a Co alloy having a Co-content of 80 at % or higher, including at least one of Zr, Nb, Ta, Cr, Mo and the like, and having an amorphous structure. The Co alloy having the amorphous structure may include alloys of CoZr, CoZrNb, CoZrTa, CoZrCr, CoZrMo and the like.

The soft magnetic underlayer 12 may preferably formed by two soft magnetic layers (not illustrated), and may preferably be provided with a Ru layer (not illustrated) between the two soft magnetic layers. By adjusting the thickness of the Ru layer in a range of 0.4 nm to 1.0 nm, or in a range of 1.6 nm to 2.6 nm, the two soft magnetic layers form an AFC (Anti-Ferromagnetically-Coupled) structure, to thereby enable suppression of the so-called spike noise.

(Orientation Control Layer)

The orientation control layer 13 is formed on the soft magnetic underlayer 12. The orientation control layer 13 may be provided in order to reduce the crystal particle size of the lower recording layer 14 and improve the recording and reproducing characteristic. As illustrated in FIG. 1, the orientation control layer 13 in this embodiment may include the first orientation control layer 13a arranged on the side of the soft magnetic underlayer 12, and the second orientation control layer 13b arranged on the first orientation control layer 13a on the side of the lower recording layer 14.

The first orientation control layer 13a may be provided in order to increase a nucleation density of the orientation control layer 13, and may include crystals that become nuclei of the columnar crystals forming the orientation control layer 13. In the first orientation control layer 13a of this embodiment, a dome-shaped projection may be formed at a peak part of a columnar crystal S1 grown from the crystal that become the nucleus, as will be described later in conjunction with FIG. 2.

The first orientation control layer 13a may preferably have a thickness of 3 nm or greater. When the thickness of the first orientation control layer 13a is less than 3 nm, the effect of increasing the orientation of the lower recording layer 14 and reducing the size of magnetic particles 42 of the lower recording layer 14 may become insufficient, and a satisfactory SNR may be difficult to obtain.

The first orientation control layer 13a may preferably be formed by a Ru alloy layer that includes a magnetic material and has a saturation magnetization of 50 emu/cc or higher. When the first orientation control layer 13a is formed by a Ru alloy layer that includes a magnetic material but has a saturation magnetization lower than 50 emu/cc, and the second orientation control layer 13b which will be described later is not made of a Ru layer that includes a magnetic material and has a saturation magnetization of 50 emu/cc or higher, a sufficiently high recording characteristic (or OW characteristic) suited for the high density recording may be difficult to obtain.

The Ru alloy layer included in the first orientation control layer 13a may preferably include a magnetic material such as Co, Fe, or the like, and the Ru alloy layer may preferably be a CoRu alloy layer or a FeRu alloy layer. In a case in which the magnetic material included in the Ru alloy layer is Co, the Co-content included in the Ru alloy layer may preferably be 66 at % or higher. In addition, in a case in which the magnetic material included in the Ru alloy layer is Fe, the Fe-content included in the Ru alloy layer may preferably be 73 at % or higher. When the Co-content included in the Ru alloy layer is 66 at % or higher, or the Fe-content included in the Ru alloy layer is 73 at % or higher, a sufficient magnetization may be generated, and the saturation magnetization of the Ru alloy layer may be made 50 emu/cc or higher.

Table 1 illustrate an example of theoretical values of the saturation magnetization (Ms) for Co, CoRu alloy, FeRu alloy, and Fe. As illustrated in Table 1, in the case of compositions in which the Co-content is 66 at % or higher in the Ru alloy layer or the Fe-content is 73 at % or higher in the Ru alloy layer, the saturation magnetization (Ms) is 50 emu/cc or higher.

In addition, as may be seen from Table 1, the saturation magnetization (Ms) becomes 700 emu/cc or lower when the Co-content is 80 at % or lower in the Cu alloy layer. Further, as illustrated in Table 1, the saturation magnetization (Ms) becomes 500 emu/cc or lower when the Fe-content is 80 at % or lower in the Cu alloy layer.

TABLE 1

| Composition | Ms (emu/cc) |
| --- | --- |
| Co | 1440 |
| 90Co10Ru | 1030 |
| 80Co20Ru | 620 |
| 77.5Co22.5Ru | 518 |
| 70Co30Ru | 210 |
| 67Co33Ru | 87 |
| 65Co35Ru | 0 |
| Fe | 1735 |
| 90Fe10Ru | 1115 |
| 80Fe20Ru | 495 |
| 73Fe27Ru | 61 |
| 70Fe30Ru | 0 |

In the case in which Ru alloy layer is formed by the CoRu alloy layer, the Co-content may preferably be in a range of 66 at % to 80 at %, and the saturation magnetization may preferably be in a range of 50 emu/cc to 700 emu/cc. In addition, in the case in which the Ru alloy layer is formed by the FeRu alloy layer, the Co-content may preferably be in a range of 73 at % to 80 at %, and the saturation magnetization may preferably be in a range of 50 emu/cc to 500 emu/cc.

When the Co-content in the CoRu alloy layer or the Fe-content in the FeRu alloy layer exceeds 80 at %, forming of the dome-shaped projection at the peak part of the columnar crystal by the orientation control layer 13 may become difficult. In this case, the effect of reducing the size of the magnetic particles 42 forming the lower recording layer 14 may become insufficient, and the crystal orientation of the lower recording layer 14 may deteriorate and a satisfactory SNR may be difficult to obtain.

Moreover, when the saturation magnetization of the CoRu alloy layer and/or the FeRu alloy layer exceeds 500 emu/cc, it may be undesirable in that the Co-content included in the CoRu alloy layer and/or the Fe-content included in the FeRu alloy layer exceeds 80 at %.

The first orientation control layer 13a may preferably be formed by sputtering in which the sputtering gas pressure is within a range of 0.5 Pa to less than 5 Pa. When the sputtering gas pressure for the first orientation control layer 13a is in the range of 0.5 Pa to less than 5 Pa, the first orientation control layer 13a including the crystals that become the nuclei of the columnar crystals forming the orientation control layer 13 may be formed with ease.

When the sputtering gas pressure for the first orientation control layer 13a is less than 0.5 Pa, the orientation of the layer that is formed may deteriorate, and the effect of reducing the size of the magnetic particles 42 forming the lower recording layer 14 may be insufficient.

On the other hand, when the sputtering gas pressure for the first orientation control layer 13a is 5 Pa or higher, the crystal properties of the layer that is formed may deteriorate, the hardness of the layer may deteriorate, to thereby deteriorate the reliability of the magnetic disk 1.

Figure 2:
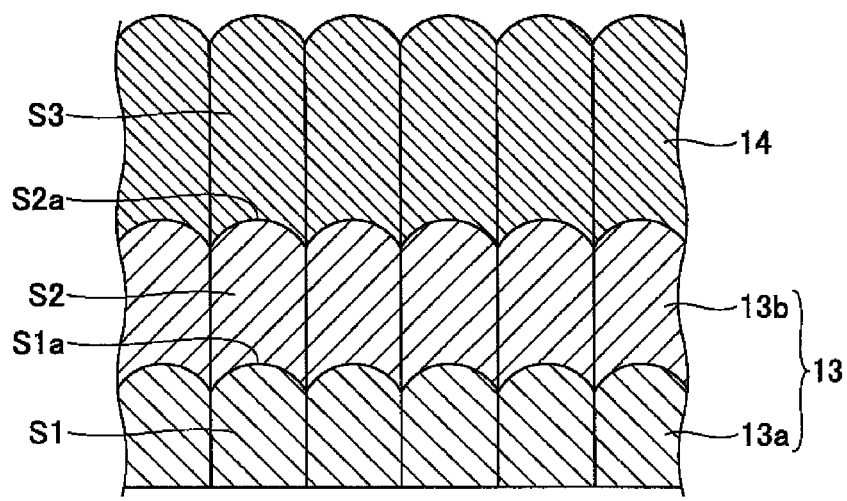
FIG. 2 is a cross sectional view on an enlarged scale illustrating a state in which columnar crystals of an orientation control layer and a lower recording layer are grown perpendicularly to a substrate surface.

As illustrated in FIG. 2, the second orientation control layer 13b may include a columnar crystal S2 with a dome-shaped projection formed at a peak part thereof, in continuous with the columnar crystal S1 included in the first orientation control layer 13a and forming the nucleus of the crystal, in the direction (hereinafter also referred to as the "thickness direction") taken along the thickness of the magnetic disk 1. The thickness direction is perpendicular to the substrate surface, and corresponds to a deposition direction in which each layer of the magnetic disk 1 including the lower recording layer 14 are deposited. In this embodiment, the second orientation control layer 13b may be grown on the dome-shaped projection of the columnar crystal S1 included in the first orientation control layer 13a and forming the crystal that becomes the nucleus, and include the columnar crystal S2 that is continuous with the crystal particle (or columnar crystal S1) forming the first orientation control layer 13a in the thickness direction.

The second orientation control layer 13b may preferably have a thickness of 6 nm or greater. When the thickness of the second orientation control layer 13b is less than 6 nm, the effect of increasing the orientation of the lower recording layer 14 and reducing the size of magnetic particles 42 may become insufficient, and a satisfactory SNR may be difficult to obtain.

The second orientation control layer 13b may preferably be formed by a Ru alloy layer that includes a magnetic material and has a saturation magnetization of 50 emu/cc or higher. When the second orientation control layer 13b is formed by a Ru alloy layer that includes a magnetic material but has a saturation magnetization lower than 50 emu/cc, and the first orientation control layer 13a described above is not made of a Ru layer that includes a magnetic material and has a saturation magnetization of 50 emu/cc or higher, a sufficiently high recording characteristic (or OW characteristic) suited for the high density recording may be difficult to obtain.

The Ru alloy layer included in the second orientation control layer 13b may be similar to the Ru alloy layer included in the first orientation control layer 13a.

The Ru alloy layer included in the second orientation control layer 13b may be made of the same material as the Ru alloy layer included in the first orientation control layer 13a, or may be made of a material different from that of the first orientation control layer 13a. More particularly, one of the first and second orientation control layers 13a and 13b may be formed by a CoRu alloy layer, and the other of the first and second orientation control layers 13a and 13b may be formed by a FeRu alloy layer, for example.

The second orientation control layer 13b may preferably be formed by sputtering in which the sputtering gas pressure is higher than that used to sputter the first orientation control layer 13a and is within a range of 5 Pa to 18 Pa. When the sputtering gas pressure for the first orientation control layer 13a is in the range of 5 Pa to 18 Pa, the second orientation control layer 13b including the columnar crystals S2 having the dome-shaped projection formed at the peak part thereof may be formed with ease in continuous with the columnar crystals S1 included in the first orientation control layer 13a and forming the nuclei of the crystals, in the thickness direction.

When the sputtering gas pressure for the second orientation control layer 13b is less than 5 Pa, the effect of isolating the crystal particles of the lower recording layer 14 grown on the orientation control layer 13 and reducing the magnetic particle size of the perpendicular magnetic layer may be insufficient, and it may be difficult to obtain a satisfactory SNR and thermal stability. On the other hand, when the sputtering gas pressure for the second orientation control layer 13b exceeds 18 Pa, the hardness of the second orientation control layer 13b may deteriorate.

In this embodiment, it is assumed for the sake of convenience that both the first orientation control layer 13a and the second orientation control layer 13b are formed by a Ru alloy layer including a magnetic material and having a saturation magnetization of 50 emu/cc or higher. However, one of the first and second orientation control layers 13a and 13b may be formed by such a Ru alloy layer. In other words, at least one of the first and second orientation control layers 13a and 13b may be formed by the Ru alloy layer including the magnetic material and having the saturation magnetization of 50 emu/cc or higher. Moreover, although the orientation control layer 13 in this embodiment has the two-layer structure formed by the first and second orientation control layers 13a and 13b, the orientation control layer 13 may have a single-layer structure. Furthermore, at least one of the first and second orientation control layers 13a and 13b may have a multi-layer structure formed by three or more layers.

A third orientation control layer (not illustrated) may preferably be provided between the soft magnetic underlayer 12 and the first orientation control layer 13a. When the third orientation control layer is formed by a NiW alloy, for example, crystal particles having a high c-axis orientation may be grown when forming the first orientation control layer 13a having a hcp (hexagonal close-packed) structure on the third orientation control layer. When the third orientation control layer is formed by the NiW alloy, a W-content within the NiW alloy may preferably be in a range of 3 at % to 10 at %. When the W-content in the NiW alloy is less than 3 at % or exceeds 10 at %, the effect of controlling the orientation and the crystal particle size of the magnetic disk 1 may deteriorate, which may be undesirable. Although the NiW alloy is slightly magnetic, the saturation magnetization of the third orientation control layer is not reduced excessively thereby. However, similarly as in the case of the first and second orientation control layers 13a and 13b, Co or Fe may be included in the NiW alloy forming the third orientation control layer, in order to increase the saturation magnetization.

The third orientation control layer may preferably have a thickness in a range of 2 nm to 20 nm. When the thickness of the third orientation control layer is less than 2 nm, the effect of reducing the crystal particle size may be insufficient and the orientation may deteriorate, which may be undesirable. On the other hand, when the thickness of the third orientation control layer exceeds 20 nm, the crystal particle size of the magnetic disk 1 may deteriorate, which may be undesirable.

When forming the orientation control layer 13 by the single-layer structure, the orientation control layer 13 may be formed by the Ru alloy layer including the magnetic material and having the saturation magnetization of 50 emu/cc or higher. In addition, when forming the orientation control layer 13 by the multi-layer structure, the multi-layer structure may include at least one Ru alloy layer including the magnetic material and having the saturation magnetization of 50 emu/cc or higher, and the multi-layer structure may include a layer other than the Ru alloy layer, such as a Ru layer, for example.

Next, a description will be given of a relationship between the crystal particles forming the orientation control layer 13 and the magnetic particles forming the lower recording layer 14 in the magnetic disk 1, by referring to FIG. 2. FIG. 2 is a cross sectional view on an enlarged scale illustrating a state in which columnar crystals of the orientation control layer 13 and the lower recording layer 14 are grown perpendicularly to the substrate surface. In FIG. 2, the illustration of parts of the magnetic disk 1 other than the first and second orientation control layers 13a and 13b forming the orientation control layer 13, and the lower recording layer 14, is omitted.

As illustrated in FIG. 2, a concavo-convex surface S1a may be formed on the first orientation control layer 13a by the dome-shaped projections at the peak parts of the columnar crystals S1 forming the first orientation control layer 13a. The columnar crystals S2 of the crystal particles forming the second orientation control layer 13b may grow on the concavo-convex surface S1a of the first orientation control layer 13a, in the thickness direction. In addition, a concavo-convex surface S2a may be formed on the second orientation control layer 13b by the dome-shaped projections at the peak parts of the columnar crystals S2 forming the second orientation control layer 13b. Columnar crystals S3 of the crystal particles forming the lower recording layer 14 may grow on the columnar crystals S2 forming the second orientation control layer 13b, in the thickness direction. In this embodiment, because the crystal particles of the lower recording layer 14 grow on the dome-shaped projections of the second orientation control layer 13b, the isolation of the crystal particles of the perpendicular magnetic layer that are grown may be promoted, and the isolated crystal particles of the lower recording layer 14 may grow in the form of columnar crystals.

Hence, according to the magnetic disk 1 in this embodiment, the columnar crystals S2 of the second orientation control layer 13b and the columnar crystals S3 of the lower recording layer 14 may grow epitaxially as continuous columnar crystals on the columnar crystals S1 of the first orientation control layer 13a. In this embodiment, the lower recording layer 14 has the multi-layer structure, as illustrated in FIG. 1. The crystal particles forming each of the layers 14a and 14b of the lower recording layer 14 having the multi-layer structure may repeatedly grow epitaxially in the form of continuous columnar crystals, from the orientation control layer 13 up to the second lower recording layer 14b on the upper side of the lower recording layer 14. Hence, in this embodiment, the size of the crystal particles forming the first orientation control layer 13a may be reduced and the density of the columnar crystals S1 may be increased. For this reason, the densities of the columnar crystals S2 of the second orientation control layer 13b that grow from the peak parts of the columnar crystals S1 in the thickness direction, and the columnar crystals S3 of the lower recording layer 14 having the multi-layer structure that grow from the peak parts of the columnar crystals S2 in the thickness direction, may be increased.

(Lower Recording Layer)

The lower recording layer 14 may be formed on the orientation control layer 13. As illustrated in FIG. 1, the lower recording layer 14 in this embodiment may include, from the side of the nonmagnetic substrate 11, the first lower recording layer 14a and the second lower recording layer 14b. The crystal particles forming each of the first and second lower recording layers 14a and 14b may grow epitaxially in the form of columnar crystal in continuous with the columnar crystals of the first and second orientation control layers 13a and 13b of the orientation control layer 13.

Figure 3:
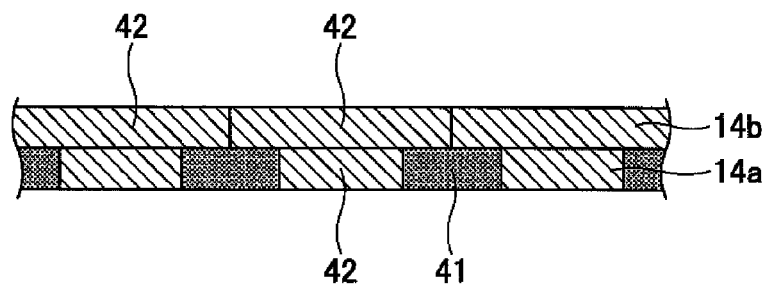
FIG. 3 is a cross sectional view on an enlarged scale illustrating a part of a stacked structure of magnetic layers forming the lower recording layer.

FIG. 3 is a cross sectional view on an enlarged scale illustrating a part of a stacked structure of magnetic layers forming the lower recording layer 14. As illustrated in FIG. 3, the first lower recording layer 14a forming the lower recording layer 14 may have a granular structure preferably including magnetic particles (or magnetic crystal particles) 42 including Co, Cr and Pt, and an oxide 41. For example, Cr, Si, Ta, Al, Ti, Mg, Co, and the like may preferably be used for the oxide 41. In addition, $TiO_2$, $Cr_2O_3$, $SiO_2$, and the like may further preferably be used for the oxide 41. Moreover, the first lower recording layer 14a may preferably be formed by a composite oxide in which two or more kinds of oxides are added. The composite oxides may preferably use $Cr_2O_3$—$SiO_2$, $Cr_2O_3$—$TiO_2$, $Cr_2O_3$—$SiO_2$—$TiO_2$, and the like.

The magnetic particles 42 may preferably be dispersed within the first lower recording layer 14a. In addition, the magnetic particles 42 may preferably form a columnar structure that vertically penetrates the first and second lower recording layers 14a and 14b. Satisfactory orientation and crystal properties of the first lower recording layer 14a may be obtained by this columnar structure, and as a result, a SNR suited for the high-density recording may be obtained.

In order to obtain the lower recording layer 14 including the magnetic particles 42 with the columnar structure, it may be preferable to suitably set the content (or amount) of the oxide 41 included in the first lower recording layer 14a and the deposition condition of the first lower recording layer 14a. The content of the oxide 41 included in the first lower recording layer 14a may preferably be 3 mol % or higher and 18 mol % or lower, and more preferably be 6 mol % or higher and 13 mol % or lower, with respect to a mol total calculated using an alloy of Co, Cr, Pt, and the like forming the magnetic particles 42 as one compound. The content of the oxide 41 in the first lower recording layer 14a may preferably be in the range of the mol % described above, because the oxide 41 precipitates in the periphery of the magnetic particles 42 when the first lower recording layer 14a is formed and the isolation and size reduction of the magnetic particles 42 may be achieved.

On the other hand, when the content of the oxide 41 in the first lower recording layer 14a exceeds 18 mol %, the oxide 41 may remain within the magnetic particles 42 to deteriorate the orientation and crystal properties of the magnetic particles, and the oxide 41 may precipitate above and below the magnetic particles 42 to make it difficult for the columnar structure vertically penetrating the first and second lower recording layers 14a and 14b to be formed, which may be undesirable. On the other hand, when the content of the oxide 41 in the first lower recording layer 14a is lower than 3 mol %, the isolation and size reduction of the magnetic particles 42 may become insufficient, to increase the noise at the time of the recording and reproduction and make it difficult to obtain the SNR suited for the high-density recording, which may be undesirable.

The Cr-content in the first lower recording layer 14a may preferably be 4 at % or higher and 19 at % or lower, and more preferably be 6 at % or higher and 17 at % or lower. When the Cr-content in the first lower recording layer 14a is in a range of 4 at % or higher and 19 at % or lower, a magnetic anisotropy constant Ku of the magnetic particles 42 does not become excessively small and the high magnetization may be maintained, and thus, the recording and reproducing characteristic suited for the high-density recording and the sufficiently high thermal stability may be obtained.

On the other hand, when the Cr-content in the first lower recording layer 14a exceeds 19 at %, the magnetic anisotropy constant Ku of the magnetic particles 42 may become small, the thermal stability may deteriorate, and the crystal properties and the orientation of the magnetic particles 42 may deteriorate. As a result, the recording and reproducing characteristic may deteriorate, which may be undesirable. On the other hand, when the Cr-content in the first lower recording layer 14a is lower than 4 at %, the magnetic anisotropy constant Ku may become large and the perpendicular coercivity may become excessively high, to prevent the magnetic head from sufficiently writing the data. In this case, the recording characteristic (or OW characteristic) may become unsuited for the high-density recording, which may be undesirable.

The Pt-content in the first lower recording layer 14a may preferably be 8 at % or higher and 20 at % or lower. When the Pt-content in the first lower recording layer 14a is lower than 8 at %, a sufficiently large magnetic anisotropy constant Ku required by the lower recording layer 14 in order to obtain the thermal stability suited for the high-density recording may be difficult to obtain, which may be undesirable. On the other hand, when the Pt-content in the first lower recording layer 14a exceeds 20 at %, a stacking defect may occur within the magnetic particles 42, to decrease the magnetic anisotropy constant Ku. In addition, when the Pt-content in the first lower recording layer 14a exceeds 20 at %, a layer having a fcc (face-centered cubic) structure may be formed within the magnetic particles 42, to deteriorate the crystal properties and the orientation, which may be undesirable. Accordingly, in order to obtain the thermal stability and the recording and reproducing characteristic that are suited for the high-density recording, the Pt-content in the first lower recording layer 14a may preferably be in a range of 8 at % or higher and 20 at % or lower.

The magnetic particles 42 of the first lower recording layer 14a may include one or more kinds of elements selected from B, Ta, Mo, Cu, Nd, W, Nb, Sm, Tb, Ru, and Re, in addition to Co, Cr, and Pt. By additionally including such one or more kinds of elements in the magnetic particles 42, the size reduction of the magnetic particles 42 may be promoted, and the crystal properties and the orientation may be improved. As a result, the recording and reproducing characteristic and the thermal stability, that are suited for the high-density recording, may be obtained.

A total amount of the one or more kinds of elements added to Co, Cr, and Pt within the magnetic particles 42 of the first lower recording layer 14a may preferably be 8 at % or lower. When the total amount of the one or more kinds of elements added to Co, Cr, and Pt within the magnetic particles 42 exceeds 8 at %, a phase other than the hcp structure may be formed within the magnetic particles 42, to deteriorate the crystal properties and the orientation of the magnetic particles 42, and prevent the recording and reproducing characteristic and the thermal stability that are suited for the high-density recording from being obtained, which may be undesirable.

For example, the material suited for the first lower recording layer 14a may include 90(Co14Cr18Pt)-10 ($SiO_2$) {mol concentration of 90 mol % calculated using magnetic particles having a Cr-content of 14 at %, a Pt-content of 18 at %, and the remainder Co as one compound, and 10 mol % of an oxide component having $SiO_2$}, 92 (Co10Cr16Pt)-8 ($SiO_2$), 94 (Co8Cr14Pt4Nb)-6 ($Cr_2O_3$) (CoCrPt)—($Ta_2O_5$) (CoCrPt)—($Cr_2O_3$)—($TiO_2$), (CoCrPt)—($Cr_2O_3$)—($SiO_2$), (CoCrPt)—($Cr_2O_3$)—($SiO_2$)—($TiO_2$), (CoCrPtB)—(PtMo)—(TiO), (CoCrPtW)—($TiO_2$), (CoCrPtB)—($Al_2O_3$), (CoCrPtTaNd)—(MgO), (CoCrPtBCu)—($Y_2O_3$), (CoCrPtRu)—($SiO_2$), and the like.

As illustrated in FIG. 3, the second lower recording layer 14b forming the lower recording layer 14 may include magnetic particles (or magnetic crystal particles) 42 that include Co and Cr, and may preferably include no oxide 41. The magnetic particles 42 of the second lower recording layer 14b may preferably grow epitaxially on the magnetic particles 42 of the first lower recording layer 14a in the form of columnar crystals. In this case, the magnetic particles 42 of the first lower recording layer 14a and the magnetic particles 42 of the second lower recording layer 14b may preferably correspond 1:1 and grow epitaxially in the form of the columnar crystals.

When the magnetic particles 42 of the second lower recording layer 14b grow epitaxially on the magnetic particles 42 of the first lower recording layer 14a in the form of the columnar crystals, the particle size of the magnetic particles 42 in the second lower recording layer 14b may be reduced, and the crystal properties and the orientation of the second lower recording layer 14b may be improved.

A Cr-content in the second lower recording layer 14b may preferably be 10 at % or higher and 24 at % or lower. When the Cr-content in the second lower recording layer 14b is in a range of 10 at % or higher and 24 at % or lower, a sufficiently high output may be obtained at the time of a data reproduction, and a satisfactory thermal stability may be obtained. On the other hand, when the Cr-content in the second lower recording layer 14b exceeds 24 at %, the magnetization of the second lower recording layer 14b may become excessively small, which may be undesirable. In addition, when the Cr-content in the second lower recording layer 14b is lower than 10 at %, the isolation and size reduction of the magnetic particles 42 may become insufficient, to increase the noise at the time of the recording and reproduction and make it difficult to obtain the SNR suited for the high-density recording.

In addition, in a case in which the material used for the magnetic particles 42 forming the second lower recording layer 14b includes Pt in addition to Co and Cr, a Pt-content in the second lower recording layer 14b may preferably be 8 at % or higher and 20 at % or lower. When the Pt-content in the second lower recording layer 14b is in a range of 8 at % or higher and 20 at % or lower, a sufficient coercivity suited for the high-density recording may be obtained, and a high reproduced output may be maintained at the time of the reproduction. As a result, the recording and reproducing characteristic and the thermal stability that are suited for the high-density recording may be obtained. On the other hand, when the Pt-content in the second lower recording layer 14b exceeds 20 at %, the phase of the fcc structure may be formed in the second lower recording layer 14b, and the crystal properties and the orientation may deteriorate, which may be undesirable. On the other hand, when the Pt-content in the second lower recording layer 14b is less than 8 at %, a sufficiently large magnetic anisotropy constant Ku required by the lower recording layer 14 in order to obtain the thermal stability suited for the high-density recording may be difficult to obtain, which may be undesirable.

The magnetic particles 42 of the second lower recording layer 14b may form a magnetic layer having a non-granular structure, and include one or more kinds of elements selected from B, Ta, Mo, Cu, Nd, W, Nb, Sm, Tb, Ru, Re, and Mn in addition to Co, Cr, and Pt. By additionally including such one or more kinds of elements in the magnetic particles 42, the size reduction of the magnetic particles 42 may be promoted, and the crystal properties and the orientation may be improved. As a result, the recording and reproducing characteristic and the thermal stability, that are suited for the high-density recording, may be obtained.

A total amount of the one or more kinds of elements added to Co, Cr, and Pt within the magnetic particles 42 of the second lower recording layer 14b may preferably be 16 at % or lower. When the total amount of the one or more kinds of elements added to Co, Cr, and Pt within the magnetic particles 42 exceeds 16 at %, a phase other than the hcp structure may be formed within the magnetic particles 42, to deteriorate the crystal properties and the orientation of the magnetic particles 42, and prevent the recording and reproducing characteristic and the thermal stability that are suited for the high-density recording from being obtained, which may be undesirable.

Preferable materials used for the second lower recording layer 14b may include CoCrPt alloys, CoCrPtB alloys, and the like. A total content of Cr and B in the CoCrPtB alloy may preferably be 18 at % or higher and 28 at % or lower.

Amongst preferable materials used for the second lower recording layer 14b, preferable CoCrPt alloys may include Co14~24Cr8~22Pt {Cr-content of 14 at %-24 at %, Pt-content of 8 at %~22 at %, and the remainder Co}, and preferable CoCrPtB alloys may include Co10~24Cr8~22Pt0~16B {Cr-content of 10 at %~24 at %, Pt-content of 8 at %~22 at %, B-content of 0~16 at %, and the remainder Co}. Further, amongst preferable materials used for the second lower recording layer 14b, preferable CoCrPtTa alloys may include Co10~24Cr8~22Pt1~5Ta {Cr-content of 10 at %~24 at %, Pt-content of 8 at %~22 at %, Ta-content of 1 at %~5 at %, and the remainder Co}, and preferable CoCrPtTaB alloys may include Co10~24Cr8~22Pt1~5Ta1~10B {Cr-content of 10 at %~24 at %, Pt-content of 8 at %~22 at %, Ta-content of 1 at %~5 at %, B-content of 1~10 at %, and the remainder Co}. Other suitable materials for the second lower recording layer 14b may include CoCrPtBNd alloys, CoCrPtTaNd alloys, CoCrPtNb alloys, CoCrPtBW alloys, CoCrPtMo alloys, CoCrPtCuRu alloys, CoCrPtRe alloys, and the like.

The magnetic disk 1 may include the lower recording layer 14 having a coercivity higher than that of the upper recording layer 16, and the upper recording layer 16 having a coercivity lower than that of the lower recording layer 14. The servo information may be recorded on the lower recording layer 14, and the data may be recorded and reproduced with respect to the upper recording layer 16. In a magnetic disk used in the HDD that is an example of the magnetic storage apparatus, the servo information may be written only once in many cases, and the servo information may be written by a dedicated STW (Servo Track Writer) used by a manufacturer of the HDD.

In this embodiment, it is assumed for the sake of convenience that the servo information is written to the lower recording layer 14 having the higher coercivity, using the magnetic head of the STW having a high write performance. On the other hand, it is assumed for the sake of convenience that the data is recorded on the upper recording layer 16 having the coercivity lower than that of the lower recording layer 14, and the data recording may be carried out by the manufacturer of the HDD or by a user of the HDD. The write and read with respect to the upper recording layer 16 may be made by a magnetic head of a general HDD, which has a write performance sufficient to write data on the upper recording layer 16 but has a write performance lower than that of the magnetic head of the STW such that the write performance of the magnetic head of the HDD is insufficient to write the data on the lower recording layer 14.

A perpendicular coercivity (Hc) of the lower recording layer 14 may preferably be 3000 (Oe) or higher, and higher than the perpendicular coercivity (Hc) of the upper recording layer 16. When the perpendicular coercivity (Hc) of the lower recording layer 14 is lower than 3000 (Oe), the recording and reproducing characteristic, particularly the frequency characteristic, deteriorates, to deteriorate the thermal stability, which may be undesirable for a high-density recording medium.

An average particle diameter of the magnetic particles 42 forming the lower recording layer 14 may preferably be 3 nm to 12 nm. The average particle diameter of the magnetic particles 42 may be obtained by observing the lower recording layer 14 by a TEM (Transmission Electron Microscope) and processing an image obtained by the TEM.

The lower recording layer 14 may preferably have a thickness of 5 nm to 20 nm. When the thickness of the lower recording layer 14 is less than 5 nm, it may be difficult to obtain a sufficient reproduced output, and the thermal stability may deteriorate. In addition, when the thickness of the lower recording layer 14 exceeds 20 nm, the particle size of the magnetic particles 42 within the lower recording layer 14 may increase and cause the noise at the time of the recording and reproduction to increase and deteriorate the recording and reproducing characteristic typified by the SNR and the recording characteristic (or OW characteristic), which may be undesirable.

The lower recording layer 14 may be formed by three or more magnetic layers. For example, a magnetic layer having a granular structure may further be provided in addition to the first and second lower recording layers 14a and 14b in order to form a three-layer granular structure, and a lower recording layer including no oxide may be provided on the three-layer granular structure. In addition, a lower recording layer including no oxide and having a two-layer structure may be provided on the first and second lower recording layers 14a and 14b.

(Intermediate Layer)

The intermediate layer 15 may be formed on the lower recording layer 14. The intermediate layer 15 may be provided to block the magnetic coupling between the upper recording layer 16 and the lower recording layer 14 in order to prevent magnetization directions of the two recording layers 14 and 16 from affecting each other, and to reduce the crystal grain size of the upper recording layer 16 in order to improve the recording and reproducing characteristic. As illustrated in FIG. 1, the intermediate layer 15 in this embodiment may include a first intermediate layer 15a arranged on the side of the soft magnetic underlayer 12, and a second intermediate layer 15b arranged on the side of the upper recording layer 16.

The first intermediate layer 15a may be provided to increase the nucleus generating density of the intermediate layer 15, and may include crystals that become the nuclei of the columnar crystals forming the intermediate layer 15. In the first intermediate layer 15a of this embodiment, a dome-shaped projection may be formed at a peak part of a columnar crystal S11 grown from the crystal that become the nucleus, as will be described later in conjunction with FIG. 4, in a manner similar to the first orientation control layer 13a illustrated in FIG. 2.

The first intermediate layer 15a may preferably have a thickness of 3 nm or greater. When the thickness of the first intermediate layer 15a is less than 3 nm, the effect of increasing the orientation of the upper recording layer 16 and reducing the size of magnetic particles 42 forming the upper recording layer 16 may become insufficient, and a satisfactory SNR may be difficult to obtain.

The first intermediate layer 15a may preferably be formed by a Ru alloy layer that includes a magnetic material and has a saturation magnetization of 50 emu/cc or higher. When the first intermediate layer 15a is formed by a Ru alloy layer that includes a magnetic material but has a saturation magnetization lower than 50 emu/cc, and the second intermediate layer 15b which will be described later is not made of a Ru layer that includes a magnetic material and has a saturation magnetization of 50 emu/cc or higher, a sufficiently high recording characteristic (or OW characteristic) suited for the high density recording may be difficult to obtain.

The Ru alloy layer included in the first intermediate layer 15a may preferably include a magnetic material such as Co, Fe, or the like, and the Ru alloy layer may preferably be a CoRu alloy layer or a FeRu alloy layer. In a case in which the magnetic material included in the Ru alloy layer is Co, the Co-content included in the Ru alloy layer may preferably be 66 at % or higher. In addition, in a case in which the magnetic material included in the Ru alloy layer is Fe, the Fe-content included in the Ru alloy layer may preferably be 73 at % or higher. When the Co-content included in the Ru alloy layer is 66 at % or higher, or the Fe-content included in the Ru alloy layer is 73 at % or higher, a sufficient magnetization may be generated, and the saturation magnetization of the Ru alloy layer may be made 50 emu/cc or higher.

Theoretical values of the saturation magnetization (Ms) of Co, CoRu alloy, and Fe used for the intermediate layer 15 may be same as those illustrated in Table 1 described above. The magnetic material content, the deposition method, the saturation magnetization, and the like of the intermediate layer 15 may be similar to those of the orientation control layer 13 described above.

Figure 4:
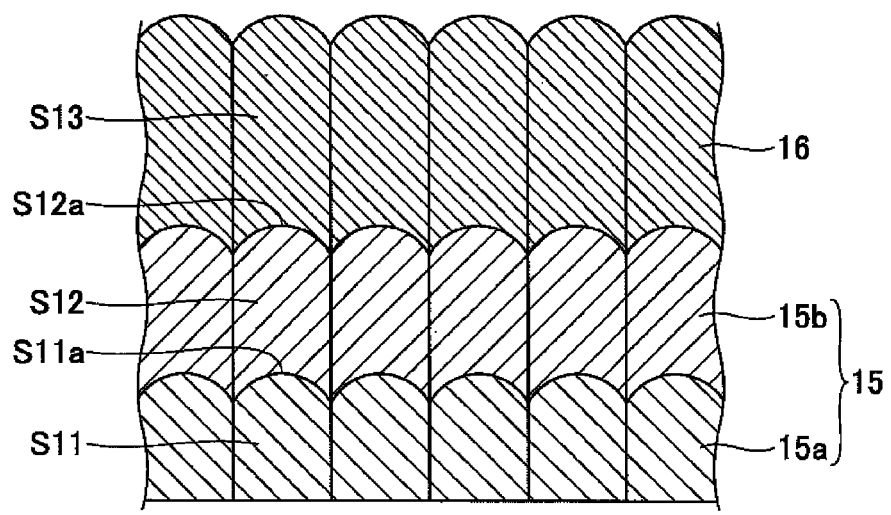
FIG. 4 is a cross sectional view on an enlarged scale illustrating a state in which columnar crystals of an intermediate layer and an upper recording layer are grown perpendicularly to the substrate surface.

As illustrated in FIG. 4, the second intermediate layer 15b may include a columnar crystal S12 with a dome-shaped projection formed at a peak part thereof, in continuous with the columnar crystal S11 included in the first intermediate layer 15a and forming the nucleus of the crystal, in the thickness direction. In this embodiment, the second intermediate layer 15b may be grown on the dome-shaped projection of the columnar crystal S11 included in the first intermediate layer 15a and forming the crystal that becomes the nucleus, and include the columnar crystal S12 that is continuous with the crystal particle (or columnar crystal S11) forming the first intermediate layer 15a in the thickness direction.

The second intermediate layer 15b may preferably be formed by a Ru alloy layer that includes a magnetic material and has a saturation magnetization of 50 emu/cc or higher. When the second intermediate layer 15b is formed by a Ru alloy layer that includes a magnetic material but has a saturation magnetization lower than 50 emu/cc, and the first intermediate layer 15a described above is not made of a Ru layer that includes a magnetic material and has a saturation magnetization of 50 emu/cc or higher, a sufficiently high recording characteristic (or OW characteristic) suited for the high density recording may be difficult to obtain.

The Ru alloy layer included in the second intermediate layer 15b may be similar to the Ru alloy layer included in the first intermediate layer 15a.

In this embodiment, it is assumed for the sake of convenience that both the first intermediate layer 15a and the second intermediate layer 15b are formed by a Ru alloy layer including a magnetic material and having a saturation magnetization of 50 emu/cc or higher. However, similarly as in the case of the orientation control layer 13, one of the first and second intermediate layers 15a and 15b may be formed by such a Ru alloy layer. In other words, at least one of the first and second intermediate layers 15a and 15b may be formed by the Ru alloy layer including the magnetic material and having the saturation magnetization of 50 emu/cc or higher. Moreover, although the intermediate layer 15 in this embodiment has the two-layer structure formed by the first and second intermediate layers 15a and 15b, the intermediate layer 15 may have a single-layer structure. Furthermore, at least one of the first and second intermediate layers 15a and 15b may be have a multi-layer structure formed by three or more layers.

A third intermediate layer (not illustrated) may preferably be provided between the lower recording layer 14 and the first intermediate layer 15a. When the third intermediate layer is formed by a NiW alloy, for example, crystal particles having a high c-axis orientation may be grown when forming the first intermediate layer 15a having a hcp (hexagonal close-packed) structure on the third intermediate layer, similarly as in the case of the third orientation control layer. When the third intermediate layer is formed by the NiW alloy, a W-content within the NiW alloy, the thickness and the layer structure of the third intermediate layer may be similar to those of the third orientation control layer.

Next, a description will be given of a relationship between the crystal particles forming the intermediate layer 15 and the magnetic particles forming the upper recording layer 16 in the magnetic disk 1, by referring to FIG. 4. FIG. 4 is a cross sectional view on an enlarged scale illustrating a state in which columnar crystals of the intermediate layer 15 and the upper recording layer 16 are grown perpendicularly to the substrate surface. In FIG. 4, the illustration of parts of the magnetic disk 1 other than the first and second intermediate layers 15a and 15b forming the intermediate layer 15, and the upper recording layer 16, is omitted.

As illustrated in FIG. 4, a concavo-convex surface S11a may be formed on the first intermediate layer 15a by the dome-shaped projections at the peak parts of the columnar crystals S11 forming the first intermediate layer 15a. The columnar crystals S12 of the crystal particles forming the second intermediate layer 15b may grow on the concavo-convex surface S11a of the first intermediate layer 15a, in the thickness direction. In addition, a concavo-convex surface S12a may be formed on the second intermediate layer 15b by the dome-shaped projections at the peak parts of the columnar crystals S12 forming the second intermediate layer 15b. Columnar crystals S13 of the crystal particles forming the upper recording layer 16 may grow on the columnar crystals S12 forming the second intermediate layer 15b, in the thickness direction. In this embodiment, because the crystal particles of the upper recording layer 16 grow on the dome-shaped projections of the second intermediate layer 15b, the isolation of the crystal particles of the perpendicular magnetic layer that are grown may be promoted, and the isolated crystal particles of the upper recording layer 16 may grow in the form of columnar crystals.

Hence, according to the magnetic disk 1 in this embodiment, the columnar crystals S12 of the second intermediate layer 15b and the columnar crystals S13 of the upper recording layer 16 may grow epitaxially as continuous columnar crystals on the columnar crystals S11 of the first intermediate layer 15a. In this embodiment, the upper recording layer 16 has the multi-layer structure, as illustrated in FIG. 1. The crystal particles forming each of the layers 16a and 16b of the upper recording layer 16 having the multi-layer structure may repeatedly grow epitaxially in the form of continuous columnar crystals, from the intermediate layer 15 up to the second upper recording layer 16b on the upper side of the upper recording layer 16. Hence, in this embodiment, the size of the crystal particles forming the first intermediate layer 15a may be reduced and the density of the columnar crystals S11 may be increased. For this reason, the densities of the columnar crystals S12 of the second intermediate layer 15b that grow from the peak parts of the columnar crystals S11 in the thickness direction, and the columnar crystals S13 of the upper recording layer 16 having the multi-layer structure that grow from the peak parts of the columnar crystals S12 in the thickness direction, may be increased.

(Upper Recording Layer)

The upper recording layer 16 may be formed on the intermediate layer 15. As illustrated in FIG. 1, the upper recording layer 16 in this embodiment may include, from the side of the nonmagnetic substrate 11, the first upper recording layer 16a and the second upper recording layer 16b. The crystal particles forming each of the first and second upper recording layers 16a and 16b may grow epitaxially in the form of columnar crystal in continuous with the columnar crystals of the first and second intermediate layers 15a and 15b of the intermediate layer 15.

Figure 5:
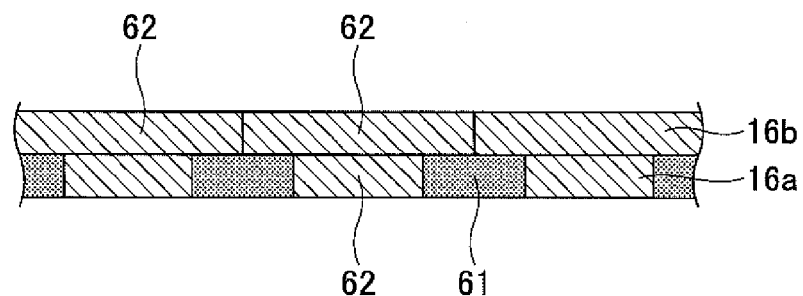
FIG. 5 is a cross sectional view on an enlarged scale illustrating a part of a stacked structure of a magnetic layer and a nonmagnetic layer forming the upper recording layer.

FIG. 5 is a cross sectional view on an enlarged scale illustrating a part of a stacked structure of magnetic layers forming the upper recording layer 16. As illustrated in FIG. 5, the first upper recording layer 16a forming the upper recording layer 16 may have a granular structure preferably including magnetic particles (or magnetic crystal particles) 62 including Co, Cr and Pt, and an oxide 61. For example, Cr, Si, Ta, Al, Ti, Mg, Co, and the like may preferably be used for the oxide 61. In addition, $TiO_2$, $Cr_2O_3$, $SiO_2$, and the like may further preferably be used for the oxide 61. Moreover, the first upper recording layer 16a may preferably be formed by a composite oxide in which two or more kinds of oxides are added. The composite oxides may preferably use $Cr_2O_3$—$SiO_2$, $Cr_2O_3$—$TiO_2$, $Cr_2O_3$—$SiO_2$—$TiO_2$, and the like.

The magnetic particles 62 may preferably be dispersed within the first upper recording layer 16a. In addition, the magnetic particles 62 may preferably form a columnar structure that vertically penetrates the first and second upper recording layers 16a and 16b. Satisfactory orientation and crystal properties of the first upper recording layer 16a may be obtained by this columnar structure, and as a result, a SNR suited for the high-density recording may be obtained.

In this embodiment, the alloy composition, structure, deposition method, alloy composition range, and the like of the upper recording layer 16 may basically be the same as those of the lower recording layer 14. However, in the magnetic disk 1 of this embodiment, the lower recording layer 14 has a coercivity higher than that of the upper recording layer 16, that is, the upper recording layer 16 has a coercivity lower than that of the lower recording layer 14, as described above. In addition, the servo information is recorded on the lower recording layer 14 having the higher coercivity, and the data is recorded and reproduced with respect to the upper recording layer 16 having the lower coercivity, as also described above.

(Protection Layer)

The protection layer 17 may be formed on the upper recording layer 16. The protection layer 17 may be provided to prevent corrosion of the upper recording layer 16, and to prevent damage to the medium surface or the magnetic head itself when the magnetic head and the magnetic disk 1 make contact. The protection layer 17 may be made of a known material. For example, the protection layer 17 may be made of a material including $SiO_2$ or $ZrO_2$. From the point of view of realizing a high recording density, the protection layer 17 may preferably have a thickness of 1 nm to 10 nm, for example, in order to reduce the distance between the magnetic head and the magnetic disk 1. For example, the protection layer 17 may be framed by CVD (Chemical Vapor Deposition), PVD (Physical Vapor Deposition), and the like.

(Lubricant Layer)

The lubricant layer 18 may be formed on the protection layer 17. For example, the lubricant layer 18 may preferably be made of a lubricant such as perfluoropolyether, fluorinated alcohol, fluorinated carboxylic acid, and the like. For example, the lubricant layer 18 may be formed by dipping and the like.

(Magnetic Storage Apparatus)

Figure 6:
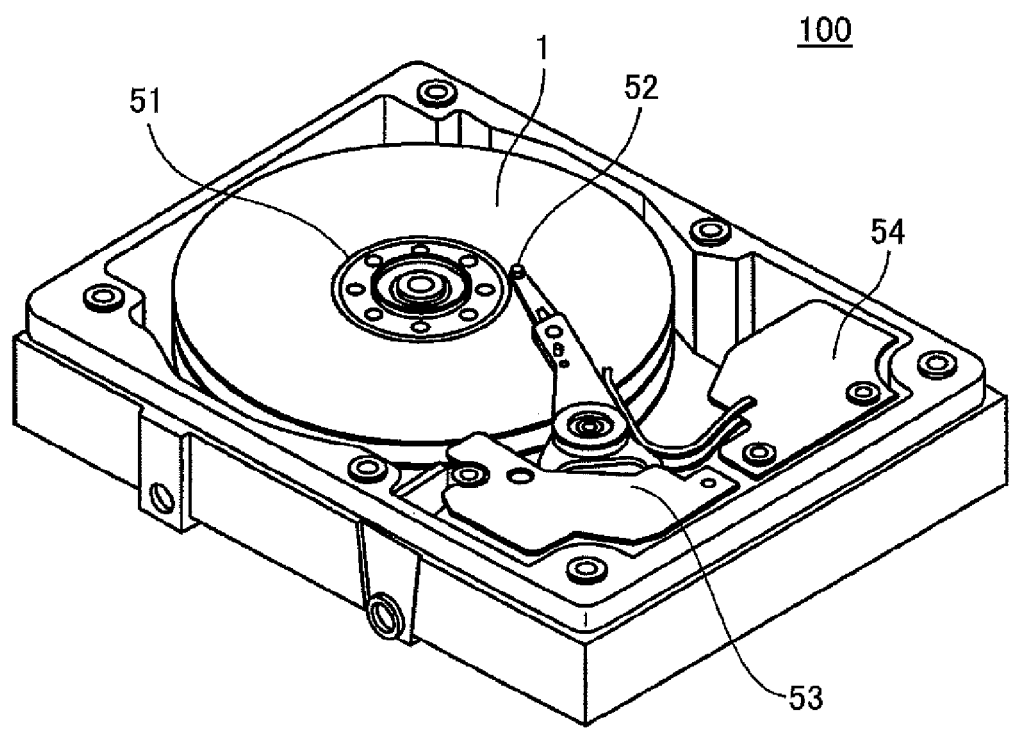
FIG. 6 is a perspective view illustrating an example of a magnetic storage apparatus in one embodiment of the present invention.

FIG. 6 is a perspective view illustrating an example of the magnetic storage apparatus in one embodiment of the present invention. A magnetic disk drive (or HDD) 100 illustrated in FIG. 6 is an example of the magnetic storage apparatus, and is provided with the magnetic disk 1 described above, which is an example of the magnetic recording medium.

The HDD 100 may include the magnetic disk 1 having the structure illustrated in FIG. 1, a medium driving part 51 that rotationally drives the magnetic disk 1, a magnetic head 52 that writes and reads (that is, records and reproduces) information with respect to the magnetic disk 1, a head driving part 53 that moves the magnetic head 52 relative to the magnetic disk 1, and a signal processing system 54.

The signal processing system 54 may subject data input from an external host unit (not illustrated) or the like to a known signal processing, in order to supply recording signals suited for the recording on the magnetic disk 1 to the magnetic head 52. For example, a magnetic head suited for the high-density recording and including a reproducing element such as a GMR (Giant Magneto Resistive) element that utilizes the GMR effect, may be used for the magnetic head 52. The signal processing system 43 subjects the signals read from the magnetic disk 1 by the magnetic head 52 to a known signal processing, and outputs reproduced data to the external host unit or the like, and outputs a control signal to the head driving part 53 in order to move the head 52 to a specified position on the magnetic disk 1, according to the specified position on the magnetic disk 1 and reproduced servo information indicating a present position of the magnetic head 52. The magnetic head 52 that is moved to the specified position on the magnetic disk 1 may read data from the specified position or write data to the specified position.

The medium driving part 51, the magnetic head 52 including a recording element and the reproducing element, the head driving part 53, and the signal processing system 54 may respectively employ known structures, and thus, illustration and detailed description thereof will be omitted.

In the magnetic disk 1, the data region in which the data write and the data read are performed may be provided in the upper recording layer 16 forming the perpendicular magnetic layer, and the servo information region in which the servo information is recorded may be provided in the lower recording layer 14 forming the perpendicular magnetic layer. In other words, the data region and the servo information region may be provided at overlapping regions of the recording surface in the plan view, and are not limited to separate regions of the recording surface in the plan view. Hence, the data region in which the data write and the data read are performed may be extended approximately to the entire recording surface of the magnetic disk 1, and the recording capacity (or in-plane recording density) per unit area of the magnetic disk 1 may be increased.

Because the servo information recorded on the lower recording layer 14 and the data recorded on the upper recording layer 16 may overlap in the recording surface of the magnetic disk 1, the magnetic head 52 may simultaneously read both the servo information and the data. For example, by recording the servo information and the data at different recording frequencies (or write frequencies), the output signal of the magnetic head 52, including the servo information and the data may be passed through a separating unit (or separating means) that is formed by a filter or amplifiers having different frequency bands, in order to separate the reproduced servo information and the reproduced data. At least a part of the separating unit may be provided within the signal processing system 54.

An example of the separating unit may be formed by a head amplifier for the servo information and a head amplifier for the data, respectively having different frequency bands. In this case, the signals reproduced from the magnetic disk 1 by the magnetic head 52 may be processed in parallel by the head amplifier for the servo information and the head amplifier for the data, in order to output the servo information separated from the reproduced signals from the head amplifier for the servo information, and to output the data separated from the reproduced signals from the head amplifier for the data, utilizing the different frequency bands of the servo information and the data. Another example of the separating unit (or separating means) may include a single head amplifier to which the signals reproduced from the magnetic disk 1 by the magnetic head 52 are input, and a filter that separates the output of the single head amplifier into the servo information and the data, utilizing the different frequency bands of the servo information and the data. In this latter case, the separating unit (or separating means) may further include a first amplifier to amplify the servo information output from the filter, and a second amplifier to amplify the data output from the filter.

The frequency band of the servo information may preferably not overlap the frequency band of the data in a range of 10 MHz to 70 MHz, for example. In addition, the frequency band of the data may preferably not overlap the frequency band of the servo information in a range of 50 MHz to 150 MHz, for example. In this embodiment, the frequency bands of the servo information and the data may refer to the frequency band of the output signal of the magnetic head 52 at the time of the reproduction when the information is read from the magnetic disk 1 within the HDD 100, and the frequency band of the signal at the time of the recording when the data is written on the magnetic disk 1 by the magnetic head 52.

The servo information may preferably have a structure including bust information, address information, and preamble information, similar to the servo information recorded on the known magnetic disk. Hence, the servo information may be reproduced from the magnetic disk 1 by the magnetic head 52 in order to position the magnetic head 52 to a specific position or a specific region on the magnetic disk 1 in a manner similar to that used by the known HDD, and read or write the data from the specified position or specified region on the magnetic disk 1.

Accordingly, the HDD 100 illustrated in FIG. 6 may include the magnetic disk 1 having the SNR, the recording characteristic (or OW characteristic), and the thermal stability, that are suited for the high-density recording.

PRACTICAL EXAMPLE

Next, a description will be given of practical examples in which the magnetic disk, which is an example of the magnetic recording medium, is fabricated by the following fabrication method and evaluated.

First, a cleaned glass substrate (manufactured by Konica Minolta, Inc. and having an outer diameter of 2.5 inches) is placed within a deposition chamber of a DC magnetron sputtering apparatus (C-3040 manufactured by Canon Anelva Corporation), and the inside of the deposition chamber is evacuated to a vacuum of $1 \times 10^{-5}$ Pa. Thereafter, a bonding layer having a thickness of 10 nm is deposited on the glass substrate by Ar sputtering (sputtering gas pressure of 1 Pa) using a Cr target.

A soft magnetic layer having a thickness of 25 nm is deposited on the bonding layer by Ar sputtering (sputtering gas pressure of 1 Pa) using a 70Co-20Fe-5Zr-5Ta{Fe-content of 20 at %, Zr-content of 5 at %, Ta-content of 5 at %, and the remainder Co} target at a substrate temperature of 100° C. or lower. A Ru layer having a thickness of 0.7 nm is deposited on the soft magnetic layer, and a 70Co-20Fe-5Zr-5Ta soft magnetic layer having a thickness of 25 nm is deposited on the Ru layer, in order to form a soft magnetic underlayer.

Next, an orientation control layer having a three-layer structure is formed on the soft magnetic underlayer. In other words, Ar sputtering (sputtering gas pressure of 1 Pa) is performed to deposit a 90Ni6W4Co layer (200 emu/cc) having a thickness of 10 nm and a 67Co33Ru layer (87 emu/cc) having a thickness of 10 nm, and the Ar sputtering gas pressure is changed to 10 Pa to deposit a 67Co33Ru layer (87 emu/cc) having a thickness of 10 nm, to form the orientation control layer having the three-layer structure. A magnetic layer having a thickness of 10 nm is deposited on the orientation control layer having the three-layer structure by Ar sputtering (sputtering gas pressure of 2 Pa) using $91(Co_{15}Cr_{16}Pt)\text{-}6(SiO_2)\text{-}3(TiO_2))$ {91 mol % of an alloy in which Cr-content is 15 at %, Pt-content is 16 at %, the remainder is Co, 6 mol % of an oxide including $SiO_2$, and 3 mol % of an oxide including $TiO_2$}, and a 65Co-18Cr-14Pt-3B layer having a thickness of 6 nm is deposited on this magnetic layer, in order to form a lower recording layer. The coercivity of the lower recording layer is 7000 Oe.

Next, an intermediate layer having a three-layer structure is formed on the lower recording layer. In other words, Ar sputtering (sputtering gas pressure of 1 Pa) is performed to deposit a 90Ni6W4Co layer (200 emu/cc) having a thickness of 10 nm and a 67Co33Ru layer (87 emu/cc) having a thickness of 10 nm, and the Ar sputtering gas pressure is changed to 10 Pa to deposit a 67Co33Ru layer (87 emu/cc) having a thickness of 10 nm, to form the intermediate layer having the three-layer structure.

A magnetic layer having a thickness of 10 nm is deposited on the intermediate layer having the three-layer structure by Ar sputtering (sputtering gas pressure of 2 Pa) using 65Co-10Cr-20Pt-10SiO_2, and a 65Co-18Cr-14Pt-3B layer having a thickness of 6 nm is deposited on this magnetic layer, in order to form an upper recording layer. The coercivity of the upper recording layer is 5000 Oe.

After forming a carbon protection layer having a thickness of 4 nm on the upper recording layer by ion beam deposition, a lubricant layer made of perfluoropolyether is formed on the protection layer by dipping, in order to fabricate the magnetic disk 1 of this embodiment.

(Writing Servo Information)

Next, a STW is used to record the servo information on the fabricated magnetic disk 1. The writing of the servo information is performed by rotating the magnetic disk at a rotational speed of 7200 rpm, and the recording frequencies have center frequencies of 20 MHz and 40 MHz and a frequency band of ±5 MHz. The servo information has a known structure including the burst information, the address information, and the preamble information. The writing of the servo information is performed simultaneously with respect to the lower recording layer 14 and the upper recording layer 16, and thereafter, an external magnetic field is applied to erase only the upper recording layer 16.

(Evaluation of Magnetic Recording Medium)

The magnetic disk 1 fabricated in this practical example is evaluated in the following manner. More particularly, the magnetic head 52 not capable of writing to the lower recording layer 14 is used to evaluate the read and write with respect to the upper recording layer 16 of the magnetic disk 1. The evaluation conditions are as follows.

Rotational speed of magnetic disk 1: 7200 rpm

Evaluating head: MR (Magneto Resistive) head

Recording frequency: 70 MHz (frequency band of ±5 MHz)

The write and read with respect to the upper recording layer 16 of the magnetic disk 1 is performed while positioning the magnetic head 52 based on the servo information recorded on the lower recording layer 14. As a result, compared to a conventional magnetic disk having the same track density as the magnetic disk 1, it was confirmed that a seek velocity increases by 10% on an average, and a recorded amount of the information that is written and read per magnetic disk 1 increases by 20%. It was also confirmed that the SNR is 10.5 dB and the OW characteristic is 42.0 dB, which are both satisfactory.

Therefore, because the lower recording layer forming the perpendicular magnetic layer is configured to include columnar crystals that are continuous in the thickness direction to the crystal particles forming the orientation control layer under the lower recording layer, the perpendicular orientation of the perpendicular magnetic layer may be improved. In addition, because the upper recording layer forming the perpendicular magnetic layer is configured to include columnar crystals that are continuous in the thickness direction to the crystal particles forming the intermediate layer under the upper recording layer, the perpendicular orientation of the perpendicular magnetic layer may be improved. The structure in which the columnar crystals of the perpendicular magnetic layer are continuous in the thickness direction to the crystal particles of the layer underneath may be employed only in the lower recording layer or only in the upper recording layer. Furthermore, by configuring the orientation control layer and/or the intermediate layer to include the magnetic material having a saturation magnetization of 50 emu/cc or higher, magnetization is generated in the orientation control layer and/or the intermediate layer, and a sufficiently high recording characteristic (or OW characteristic) suited for the high-density recording may be obtained even when the distance between the magnetic head and the soft magnetic underlayer under the orientation control layer becomes relatively large at the time of the recording.

According to this practical example, the perpendicular magnetic layer may be formed to include the columnar crystals that are continuous in the thickness direction to the crystal particles forming the orientation control layer and/or the intermediate layer, without introducing undesirable effects on the recording characteristic (or OW characteristic). In addition, it may be possible to realize a magnetic recording medium having the SNR, the recording characteristic (or OW characteristic), and the thermal stability that are suited for the high-density recording.

In addition, in the magnetic storage apparatus provided with the magnetic recording medium and the magnetic head described above, the magnetic recording medium independently includes the data region provided on the upper recording layer and the servo information region provided on the lower recording layer. For this reason, the SNR, the recording characteristic (or OW characteristic), and the thermal stability suited for the high-density recording may be realized.

COMPARISON EXAMPLE

A comparison example is fabricated in the same manner as the magnetic disk of the practical example described above, except that the deposition conditions for the orientation control layer and the intermediate layer are different from those of the practical example. More particularly, in the comparison example, Ar sputtering (sputtering gas pressure of 1 Pa) is performed to deposit a 94Ni5W layer (10 emu/cc) having a thickness of 10 nm and a nonmagnetic Ru layer having a thickness of 10 nm, and the Ar sputtering gas pressure is changed to 10 Pa to deposit a nonmagnetic Ru layer having a thickness of 10 nm, to form the orientation control layer having the three-layer structure. Ar sputtering (sputtering gas pressure of 1 Pa) is performed to deposit a 94Ni5W layer (10 emu/cc) having a thickness of 10 nm and a nonmagnetic Ru layer having a thickness of 10 nm, and the Ar sputtering gas pressure is changed to 10 Pa to deposit a nonmagnetic Ru layer having a thickness of 10 nm, to form the intermediate layer having the three-layer structure.

The servo information is written on the fabricated magnetic disk of the comparison example in the same manner as the practical example, and the magnetic disk of the comparison example is evaluated in the same manner as the practical example. As a result of the evaluation, the SNR is 10.2 dB and the OW characteristic is 37.0 dB for the magnetic disk of the comparison example. Hence, it was confirmed that the satisfactory SNR and the satisfactory OW characteristic obtained in the magnetic disk 1 of the practical example are not obtainable in the magnetic disk of the comparison example.

Although the embodiment and the practical example describe the magnetic disk as an example of the magnetic recording medium, the magnetic recording medium of the present invention is not limited to a disk-shaped medium.

According to the embodiments and practical examples described above, the recording capacity of the magnetic recording medium and the magnetic storage apparatus may be improved.

Further, the present invention is not limited to these embodiments and practical examples, but various variations and modifications may be made without departing from the scope of the present invention.

What is claimed is:

1. A magnetic recording medium comprising:
    a stacked structure including an orientation control layer, a lower recording layer, an intermediate layer, and an upper recording layer that are sequentially stacked,
    wherein the lower recording layer has a coercivity higher than that of the upper recording layer,
    wherein the intermediate layer includes a layer including a magnetic material and having a saturation magnetization of 50 emu/cc or higher, and
    wherein the upper recording layer includes columnar crystals continuous with crystal particles forming the intermediate layer in a direction in which the layers of the stacked structure are sequentially stacked.

2. The magnetic recording medium as claimed in claim 1, wherein
    the orientation control layer includes a layer including a magnetic material and having a saturation magnetization of 50 emu/cc or higher, and
    the lower recording layer includes columnar crystals continuous with crystal particles forming the orientation control layer in the direction in which the layers of the stacked structure are sequentially stacked.

3. The magnetic recording medium as claimed in claim 1, wherein the layer including the magnetic material and having the saturation magnetization of 50 emu/cc or higher is formed by a Ru alloy layer.

4. The magnetic recording medium as claimed in claim 3, wherein the magnetic material is Co or Fe.

5. The magnetic recording medium as claimed in claim 3, wherein the Ru alloy layer includes a CoRu alloy layer having a Co-content in a range of 66 at % to 80 at % and a saturation magnetization in a range of 50 emu/cc to 700 emu/cc, and/or a FeRu alloy layer having a Fe-content in a range of 73 at % to 90 at % and a saturation magnetization in a range of 50 emu/cc to 500 emu/cc.

6. A magnetic storage apparatus comprising:
   a magnetic recording medium as claimed in claim 1; and
   a magnetic head configured to read and write information with respect to a perpendicular magnetic layer formed by the upper recording layer and the lower recording layer of the magnetic recording medium.

7. The magnetic storage apparatus as claimed in claim 6, wherein the magnetic head reads servo information recorded on the lower recording layer, and reads and writes data with respect to the upper recording layer.

8. The magnetic recording medium as claimed in claim 1, wherein
   the orientation control layer includes a layer including a magnetic material and having a saturation magnetization of 50 emu/cc or higher, and
   the lower recording layer includes columnar crystals continuous with crystal particles forming the orientation control layer in a direction in which the layers of the stacked structure are sequentially stacked.

9. The magnetic recording medium as claimed in claim 8, wherein the layer of the orientation control layer, including the magnetic material and having the saturation magnetization of 50 emu/cc or higher is formed by a Ru alloy layer.

10. The magnetic recording medium as claimed in claim 9, wherein the magnetic material in the layer of the orientation control layer is Co or Fe.

11. The magnetic recording medium as claimed in claim 9, wherein the Ru alloy layer includes a CoRu alloy layer having a Co-content in a range of 66 at % to 80 at % and a saturation magnetization in a range of 50 emu/cc to 700 emu/cc, and/or a FeRu alloy layer having a Fe-content in a range of 73 at % to 90 at % and a saturation magnetization in a range of 50 emu/cc to 500 emu/cc.

12. A magnetic storage apparatus comprising:
    a magnetic recording medium as claimed in claim 8; and
    a magnetic head configured to read and write information with respect to a perpendicular magnetic layer formed by the upper recording layer and the lower recording layer of the magnetic recording medium.

13. The magnetic storage apparatus as claimed in claim 12, wherein the magnetic head reads servo information recorded on the lower recording layer, and reads and writes data with respect to the upper recording layer.

* * * * *